United States Patent [19]

Hasshi et al.

[11] Patent Number: 5,895,063
[45] Date of Patent: Apr. 20, 1999

[54] WHEEL SUSPENSION SYSTEM

[75] Inventors: Suehiro Hasshi; Toshiya Hasegawa, both of Wako, Japan

[73] Assignee: Honda Giken Kogyo Kabushiki Kaisha, Tokyo, Japan

[21] Appl. No.: 09/044,178

[22] Filed: Mar. 19, 1998

[30] Foreign Application Priority Data

| Mar. 21, 1997 | [JP] | Japan | 9-068785 |
| Mar. 21, 1997 | [JP] | Japan | 9-068786 |
| Mar. 21, 1997 | [JP] | Japan | 9-068787 |

[51] Int. Cl.$^6$ ............................................. B62D 17/00
[52] U.S. Cl. .......................... 280/124.134; 280/124.125; 280/124.141; 280/124.15; 280/124.128
[58] Field of Search ................ 280/124.1, 124.125, 280/124.134, 124.141, 124.142, 124.15, 124.128

[56] References Cited

U.S. PATENT DOCUMENTS

| 4,453,733 | 6/1984 | Sautter et al. | 280/124.128 |
| 4,709,935 | 12/1987 | Takizawa et al. | |
| 4,717,171 | 1/1988 | Kami et al. | 280/124.134 |
| 4,721,326 | 1/1988 | Massos et al. | 280/124.128 |
| 4,738,458 | 4/1988 | Warner | 280/124.141 |
| 4,765,647 | 8/1988 | Kondo et al. | 280/124.125 |
| 4,840,396 | 6/1989 | Kubo. | |
| 5,000,477 | 3/1991 | Minakawa et al. | |
| 5,100,165 | 3/1992 | Hespelt | 280/124.15 |
| 5,496,055 | 3/1996 | Shibahata et al. | 280/124.142 |
| 5,499,839 | 3/1996 | Wahl et al. | 280/124.134 |

FOREIGN PATENT DOCUMENTS

| 0 083 183 | 12/1982 | European Pat. Off. . |
| 0 325 899 | 12/1988 | European Pat. Off. . |
| 3-43005 | 4/1991 | Japan . |
| 2 287 918 | 3/1995 | United Kingdom . |

*Primary Examiner*—Christopher P. Ellis
*Attorney, Agent, or Firm*—Armstrong, Westerman, Hattori, McLeland & Naughton

[57] ABSTRACT

In a wheel suspension system, a trailing link, which connects of a knuckle rotatably carrying a wheel to a vehicle body, has a front end which is pivotally attached to a vehicle body via a coupling rod fitted with a rubber bush, an axial center line of the coupling rod is slanted so that a rear end thereof is offset toward a center of the vehicle body, and a rear end which is attached to the vehicle body via a lateral arm made of a plate member so as to be flexible in a fore-and-aft direction. Thus, when the rear wheel is pulled backward as a result of applying a brake, the lateral member made of a plate member deflects and the rubber bush fitted on the coupling rod connecting the front end of the trailing link to the vehicle body deforms in the axial direction. Because the axial line of the coupling rod is slanted in such a manner that the rear end of the axial line is offset toward the center of the vehicle body, as the front end of the trailing link shifts rearward, it shifts toward the center of the vehicle. Thus, a desired change in the toe-in angle is produced when a brake is applied without compromising the firmness of the steering system.

10 Claims, 3 Drawing Sheets

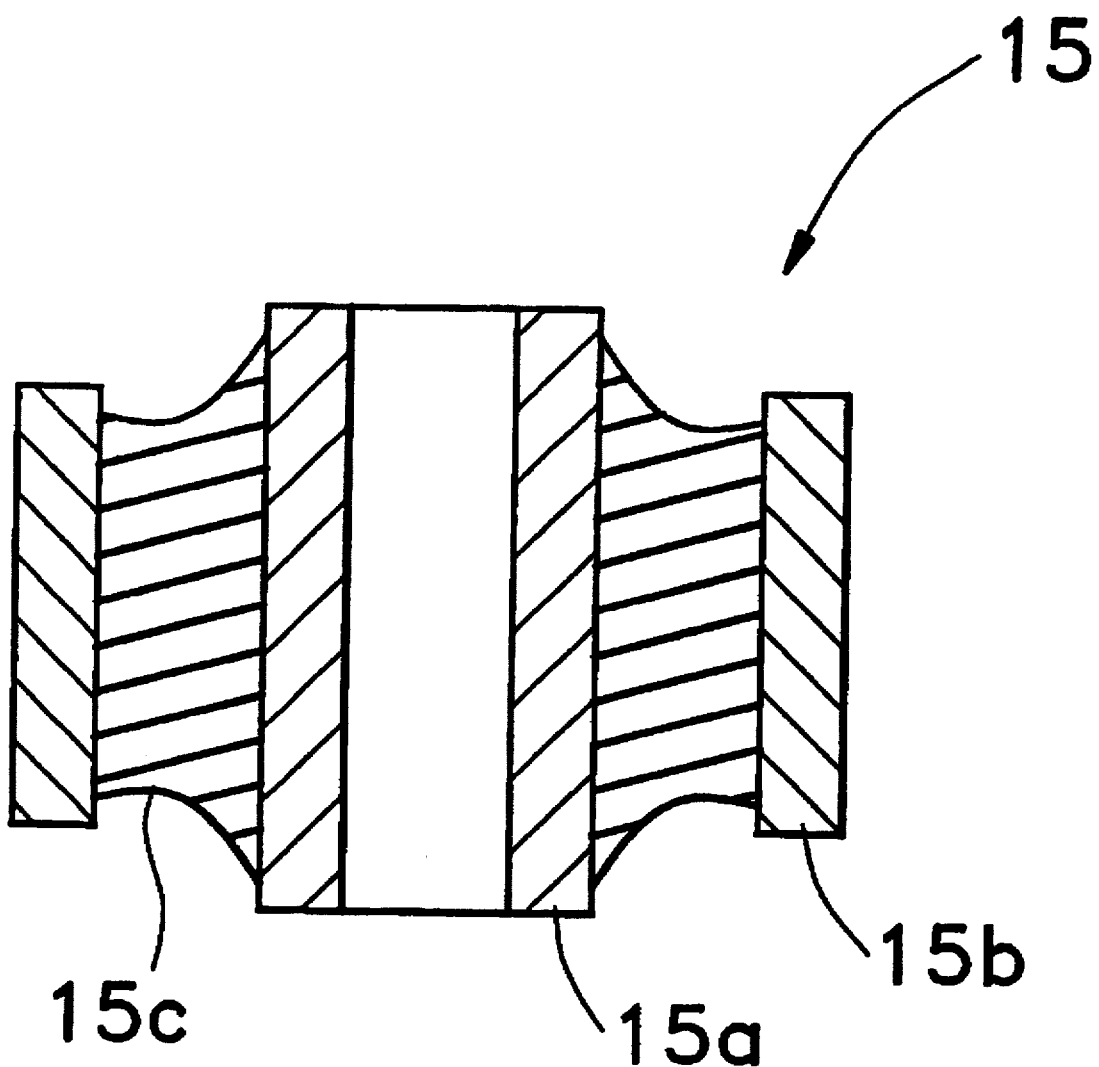

WHEEL SUSPENSION SYSTEM

TECHNICAL FIELD

The present invention relates to a vehicle wheel suspension system, and in particular to a semi-trailing arm type wheel suspension system suitable for supporting a rear wheel.

BACKGROUND OF THE INVENTION

Strut type and double wishbone type wheel suspension systems are mostly widely used as vehicle independent wheel suspension systems. The linear arrangement incorporating a coil spring and a damper (shock absorber) for damping the oscillation in a coaxial relationship is mostly widely used in such wheel suspension systems (Japanese utility model laid open publication (kokai) No. 3-43005 and others). The damper typically consists of a hydraulic telescopic shock absorber.

A conventional linear arrangement of a damper and a coil spring was however detrimental in improving the comfort of the rear seats and increasing the capacity of the luggage compartment because the axial dimension was so large that a part of the damper or the spring inevitably protruded into the passenger compartment or the luggage compartment.

In such a wheel suspension system, if the rear wheel is steered inward with respect to the turning circle of the vehicle, the side slip angle of the vehicle body for achieving a required slip angle of the rear wheel can be reduced so that the onset of the cornering force when starting a turn is advanced, and the steering response improves. It is also desirable to steer the outer rear wheel of a turning vehicle, which is required to bear a larger load, in a toe-in direction when a brake is applied thereto because it improves the controllability of the attitude of the vehicle at the time of brake application during a turn. To achieve such a goal, there has been proposed a wheel suspension system including lateral links disposed in a trapezoidal arrangement as seen from above with the aim of increasing the toe-in angle when making a turn or applying a brake.

However, according to such a conventional arrangement, it was necessary to provide a means to accommodate the change in the toe angle of the wheel in the part for connecting the lateral link to the knuckle or the vehicle body. Typically, the rubber bush in the connecting part was given with a high compliance to accomplish this goal. However, if the rubber bush is too compliant, the steering response tends to be impaired, and a desired firmness in the steering response may not be achieved. In particular, the proper tuning of the compliance of the rubber bush was highly difficult to achieve.

BRIEF SUMMARY OF THE INVENTION

In view of such problems of the prior art, a primary object of the present invention is to provide an improved wheel suspension system which can produce a desired change in the toe-in angle when a brake is applied without compromising the rigidity of the system.

A second object of the present invention is to provided a wheel suspension system which can minimize the protrusion into the passenger compartment and the luggage compartment.

A third object of the present invention is to provide a wheel suspension system which is mechanically strong, and yet easy to manufacture.

A fourth object of the present invention is to provide a wheel suspension system which is suitable for supporting a rear wheel without regard if it is a driven wheel or a non-driven wheel.

According to the present invention such objects can be accomplished by providing a vehicle wheel suspension system, comprising: a trailing link having a forward end pivotally attached to a part of a vehicle body and a rear end pivotally attached to a lower part of a knuckle rotatably carrying a wheel; a lateral arm having an inner end attached to a part of the vehicle body and an outer end attached to a part of the trailing link adjacent to a point of attachment to the knuckle; an upper arm having an inner end pivotally attached to a part of the vehicle body and an outer end pivotally attached to an upper part of the knuckle; and a spring and a damper interposed between the knuckle and the vehicle body; the forward end of the trailing link being attached to the vehicle body via a coupling which resiliently accommodates a movement along an axial line extending at an angle relative to a fore-and-aft direction with a rear end thereof offset toward a center of the vehicle body.

Thus, when the rear wheel is pulled backward as a result of applying a brake, the front end of the trailing link can deflect along an axial line and move toward the center of the vehicle body. Therefore, as the front end of the trailing link shifts rearward, it shifts toward the center of the vehicle. As a result, the angle of the trailing link with respect to the vehicle body changes in such a direction that the toe direction of the wheel moves inward.

To accommodate such a movement, the coupling for the forward end of the trailing link may comprises a rubber bush. For instance, the rubber bush may be provided with a substantially cylindrical shape having an axial center line extending substantially in the fore-and-aft direction of the vehicle body, and the vehicle body may be attached to one of inner and outer circumferential surfaces of the rubber bush while the forward end of the trailing link is attached to the other of the inner and outer circumferential surfaces of the rubber bush. It is preferable for the rubber bush fitted to the front end of the trailing link to be relatively rigid in the radial direction but relatively compliant in the axial direction so that the rubber bush may not impair the firmness in the steering system of the vehicle. This can be accomplished, for instance, by forming the shape of the rubber bush so that the axial dimension of the rubber bush is smaller in an intermediate part between the outer and inner circumferential surfaces than the parts adjacent to the outer and inner circumferential surfaces.

To favorably accommodate the movement of the knuckle which is provided by the resilient arrangement of the trailing link, the lateral arm may be adapted to resiliently accommodate a fore-and-aft movement of the outer end of the lateral arm, for instance by forming the lateral arm with a plate member having a substantially larger vertical dimension than a fore-and-aft dimension thereof.

In order to connect the rear end of the trailing link and the knuckle so that a high mechanical strength may be achieved, and the prescribed action of the suspension system may be achieved with a minimum resistance, the rear end of the trailing link may be attached to the lower part of the knuckle via a pivot shaft extending substantially horizontally and obliquely with respect to the fore-and-aft direction of the vehicle body so that a rear part of the pivot shaft is offset toward a center of the vehicle body.

Conventionally, the trailing link connecting a knuckle rotatably supporting a wheel to the vehicle body was typically formed by welding together a plurality of components which were press formed from steel plates.

Such a trailing link tends to have a complex cross sectional shape not only because of the need to ensure a sufficient strength and rigidity but also because bearings have to be formed in parts where the link is attached to the knuckle and the vehicle body. In particular, when a spring seat for a coil spring is required to be formed, the trailing link has to bear all of the load applied to the wheel, and is therefore required to be sufficiently strong so that its sectional shape becomes highly complex. This leads to an increase in the manufacturing steps, and contributed to the increase in cost.

According to the present invention such a problem can be eliminated by forming the trailing link with a pipe member which is preferably bent into a shape of letter-S as seen from above. Thus, the main part of the trailing link can be formed simply by bending a single pipe member, and a significant reduction in the manufacturing steps can be achieved in comparison with the structure which is formed by welding steel plates.

According to a preferred embodiment of the present invention, the spring consists of a coil spring, and the coil spring and a damper are disposed ahead and behind a center line of the wheel in mutually parallel relationship. Therefore, even when the wheel consists of a driven wheel, the axle of the wheel would not be interfered by the damper or the suspension spring.

According to a particularly preferred embodiment of the present invention, the damper has a slanted axial line with an upper end offset toward a center of the vehicle body, and is connected to a point adjacent to a lower part of the knuckle at a lower end thereof, and to a lower surface of a floor at an upper end thereof. Thus, the upper end of the damper is lowered so that the upper end of the damper may be attached to a point under the rear seat, and can thereby minimize interference with the passenger compartment and the luggage compartment.

BRIEF DESCRIPTION OF THE DRAWINGS

Now the present invention is described in the following with reference to the appended drawings, in which:

FIG. 3 is an enlarged sectional view of the rubber bush used in the rear wheel suspension system of FIG. 1.

DETAILED DESCRIPTION OF THE PREFERRED EMBODIMENTS

Figure 1:
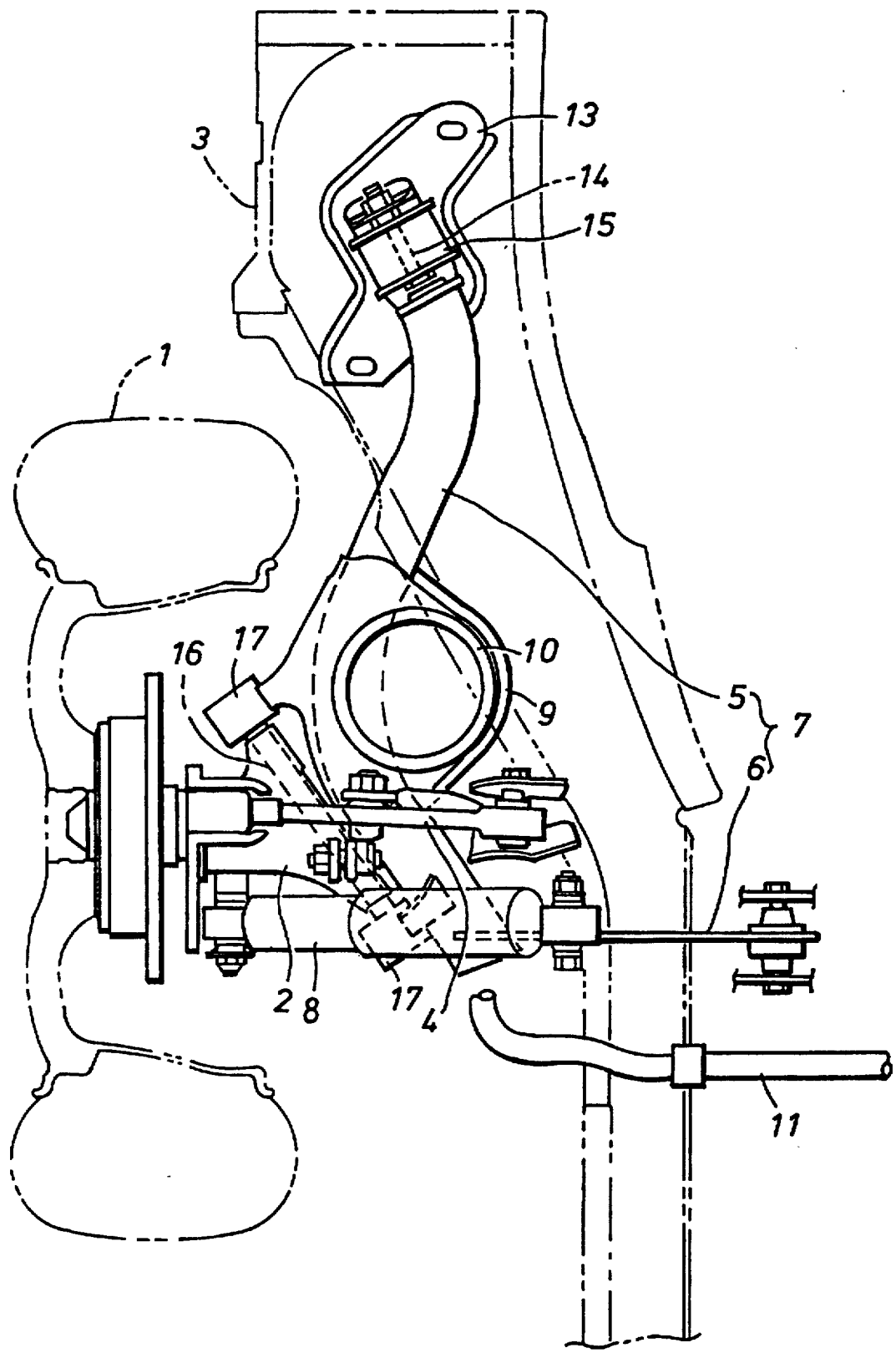
FIG. 1 is a schematic plan view of a rear wheel suspension system embodying the present invention.
Figure 2:
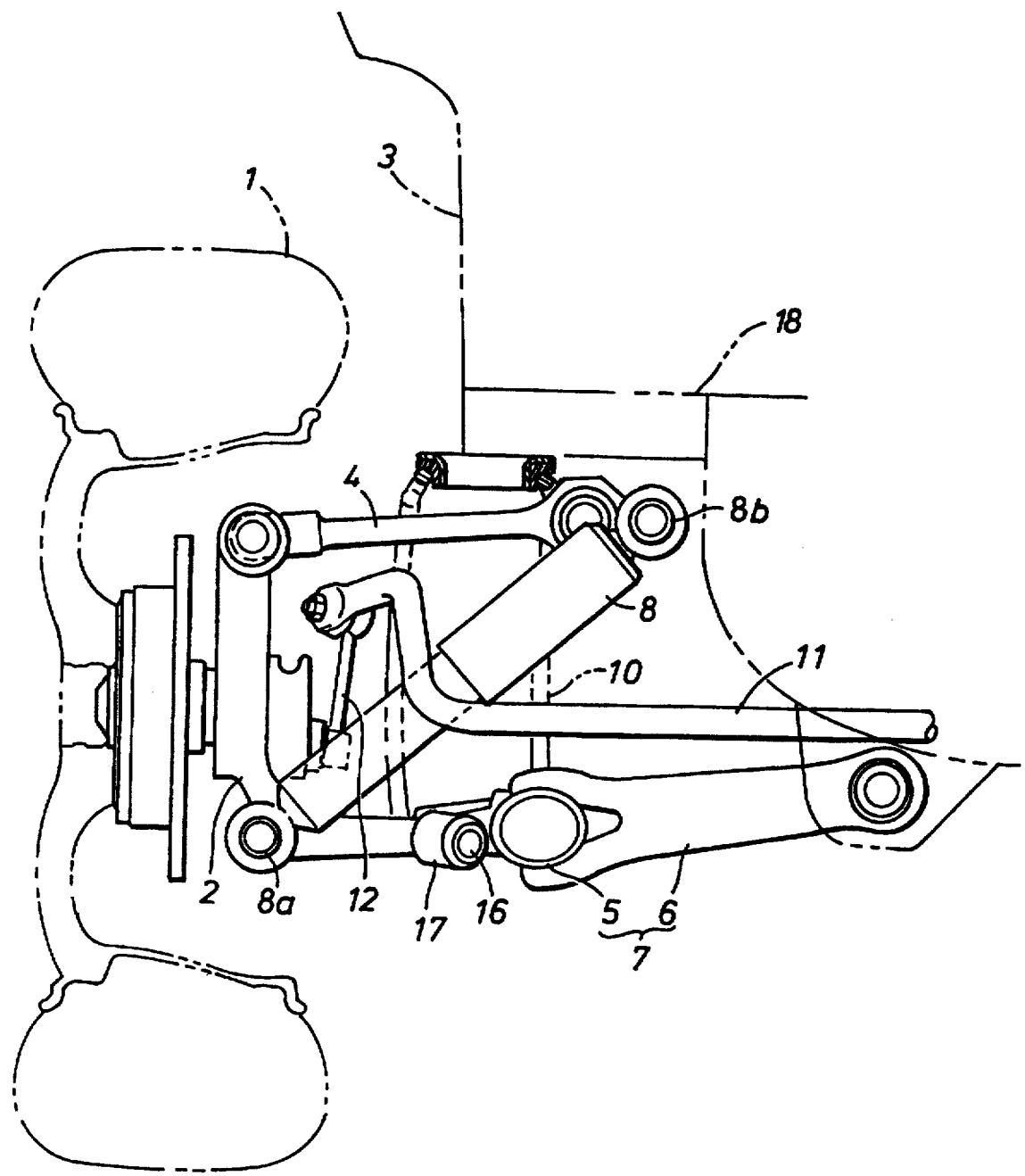
FIG. 2 is a schematic rear view of the rear wheel suspension system of FIG. 1.

FIGS. 1 and 2 show an independent wheel suspension system for a left rear wheel embodying the present invention. This wheel suspension system consists of a double wishbone type system comprising a lateral link 4 which connects an upper part of a knuckle 2 rotatably carrying a wheel 1 to a vehicle body frame 3, and a lower link 7 incorporating a trailing link 5 and a lateral arm 6 which connects a lower part of the knuckle 2 to the vehicle body frame 3. A linear damper 8 is connected between a lower part of the knuckle 2 and the vehicle body frame 3 with its upper end slanted toward the center of the vehicle body. A compression coil spring 10 is interposed between a spring seat 9 formed in an intermediate part of the trailing link 5 and the vehicle body frame 3 in a compressed state. The knuckle 2 is also connected to an end of a stabilizer rod 11 via a stabilizer link 12. The damper 8 is connected to the lower part of the knuckle 2 at a lower end 8a thereof, and to a damper mount provided in a lower surface of a rear floor member 18 located under the seat surface of the rear seat at an upper end 8b thereof.

The trailing link 5 which forms a part of the lower link 7 is made of a pipe member having an appropriate diameter which is curved in the shape of letter-S. The front end of the trailing link 5 is pivotally attached to a bracket 13 attached to the vehicle body frame 3 via a coupling rod 14 having a rear end which is slanted toward the center of the vehicle body. The lateral arm 6 is made of a plate member having a larger vertical dimension that a fore-and-aft dimension (thickness), and is fixedly secured to the rear end of the trailing link 5 by welding. The coupling rod 14 at the front end of the trailing link 5 is fitted with a rubber bush 15 so that the trailing link 5 can move in the fore-and-aft direction along the slanted axial line when the knuckle 2 is subjected to a fore-and-aft force. This is assisted by the action of the lateral arm 6 which is made of a plate member, and can therefore deflect in the fore-and-aft direction. Referring to FIG. 3, the rubber bush 15 comprises an inner tube 15a which is fitted on the coupling rod 14, an outer ring 15b which is fixedly secured to the bracket 13, and an annular rubber block 15c which is vulcanized between the inner tube 15a and the outer ring 15b. The rubber bush 15 is made relatively rigid in the radial direction but is relatively compliant in the axial direction by suitably selecting the shape of the rubber bush 15. In this particular embodiment, the shape of the rubber bush is selected so that the axial dimension of the rubber bush is smaller in an intermediate part between the outer and inner circumferential surfaces than the parts adjacent to the outer and inner circumferential surfaces.

The lower part of the knuckle 2 is pivotally supported by a bearing 17 which is formed in a rear part of the trailing link 5 via a pivot shaft 16 having an slanted axial line with a rear end thereof offset toward the center of the vehicle body.

The damper of a conventional independent wheel suspension system was typically mounted in an upright position. Therefore, the damper mount on the vehicle body had to be placed at a relatively high position so that the rear seat had to be placed higher than desired or the a portion for receiving a damper-end had to protrude into the luggage compartment because of the interference with the damper. However, according to the disclosed embodiment of the present invention, because the linear damper 8 is mounted in such a manner that the lower end 8a thereof is connected to a lower part of the knuckle 2 with the axial line thereof slanted, and is placed in parallel with the compression coil spring 10 on a different side of the central axial line of the wheel 1, the upper end 8b of the damper 8 can be placed in a relatively lower part. Therefore, the interference with the passenger compartment and the luggage compartment can be minimized for instance by placing the damper mount on the undersurface of a rear floor member 18 which is located under the seat surface of the rear seat. Also, the coil spring 10 and the linear damper 8 would not interfere with the axle of the wheel when the wheel consists of a driven wheel.

A conventional trailing link which was manufactured by welding together a plurality of components formed by press forming steel plates tended to be complex in structure because of the need to ensure a sufficient strength and rigidity and to provide bearings in parts of connection to the knuckle and the vehicle body, and, therefore, there was some difficulty in reducing the cost. However, according to the disclosed embodiment of the present invention, because the trailing link is formed by bending a pipe member which is highly resistant to bending and twisting, the trailing link having a prescribed strength can be manufactured with a substantially smaller number of manufacturing steps than the structure involving the welding of steel plates. Furthermore, by welding the spring seat 9 in a bent portion of the trailing link 9 as disclosed in the above described embodiment, the spring seat 9 additionally serves as a reinforcement for the trailing link 5, and an even higher mechanical strength can be achieved.

The mode of operation of this wheel suspension system is now described in the following. When a brake is applied to the wheel 1, because the vehicle body continues to move forward by inertia, the wheel 1 is subjected to a rearwardly directed force. As a result, the lateral arm 6 made of a plate member deflects rearward around a point of pivotal attachment to the vehicle body frame 3 while the rubber bush 15 fitted on the coupling rod 14 connecting the front end of the trailing link 5 to the vehicle body frame 3 is deformed into compression along the axial line of the coupling rod 14. Because the axial line of the coupling rod 14 is slanted with its rear end offset toward the center of the vehicle body, the front end of the trailing link 5 moves toward the center of the vehicle body as it moves rearward. This causes the angle of the trailing link wheel 1 relative to the vehicle body to change so as to increase the toe-in angle of the wheel 1.

Thus, according to the present invention, the wheel alignment is controlled by the axial deformation of the rubber bush and the fore-and-aft deflection of the lateral arm so that the tuning of the rubber bush is simplified, and the toe angle control when applying a brake can be carried out in an appropriate manner without compromising the lateral rigidity or firmness of the vehicle under a normal cruising condition.

According to the preferred embodiment, because the point of connection between the damper and the vehicle body can be lowered, the need to have the damper mount protrude into the passenger compartment is eliminated, and a significant improvement can be made in expanding the space available in association with the rear seat and in the luggage compartment. Also, because a drive axle can extend between the coil spring and the damper, it is possible to use a common rear wheel suspension system for a front drive vehicle and a four wheel drive vehicle.

When the trailing link consists of a pipe member which may be bent into the shape of letter-S as seen from above, not only the manufacturing process can be simplified but also the areas of potential rust formation can be minimized because the reduction in the number of welded parts so that a significant improvement can be made in increasing the mechanical strength of the trailing link, and simplifying the manufacturing process.

Although the present invention has been described in terms of a preferred embodiment thereof, it is obvious to a person skilled in the art that various alterations and modifications are possible without departing from the scope of the present invention which is set forth in the appended claims.

What we claim is:

1. A vehicle wheel suspension system, comprising:
   a trailing link having a forward end pivotally attached to a part of a vehicle body and a rear end pivotally attached to a lower part of a knuckle rotatably carrying a wheel;
   a lateral arm having an inner end attached to a part of the vehicle body and an outer end attached to a part of the trailing link adjacent to a point of attachment to said knuckle;
   an upper arm having an inner end pivotally attached to a part of the vehicle body and an outer end pivotally attached to an upper part of said knuckle; and
   a spring and a damper interposed between said knuckle and said vehicle body;
   said forward end of said trailing link being attached to the vehicle body via a coupling which resiliently accommodates a movement along an axial line extending at an angle relative to a fore-and-aft direction with a rear end thereof offset toward a center of said vehicle body.

2. A vehicle wheel suspension system according to claim 1, wherein said coupling for said forward end of said trailing link comprises a rubber bush.

3. A vehicle wheel suspension system according to claim 2, wherein said rubber bush is provided with a substantially cylindrical shape having an axial center line extending substantially in the fore-and-aft direction of the vehicle body, and the vehicle body is attached to one of inner and outer circumferential surfaces of said rubber bush while the forward end of said trailing link is attached to the other of said inner and outer circumferential surfaces of said rubber bush.

4. A vehicle wheel suspension system according to claim 1, wherein said lateral arm is adapted to resiliently accommodate a fore-and-aft movement of said outer end of said lateral arm.

5. A vehicle wheel suspension system according to claim 4, wherein said lateral arm consists of a plate member having a substantially larger vertical dimension than a fore-and-aft dimension thereof.

6. A vehicle wheel suspension system according to claim 1, wherein said rear end of said trailing link is attached to said lower part of said knuckle via a pivot shaft extending substantially horizontally and obliquely with respect to said fore-and-aft direction of the vehicle body so that a rear part of said pivot shaft is offset toward a center of the vehicle body.

7. A vehicle wheel suspension system according to claim 1, wherein said trailing link is formed by a pipe member.

8. A vehicle wheel suspension system according to claim 7, wherein said pipe member is bent into a shape of letter-S as seen from above.

9. A vehicle wheel suspension system according to claim 1, wherein said spring consists of a coil spring, and said coil spring and a damper are disposed ahead and behind a center line of said wheel in mutually parallel relationship.

10. A vehicle wheel suspension system according to claim 9, wherein said damper has a slanted axial line with an upper end offset toward a center of the vehicle body, and is connected to a point adjacent to a lower part of said knuckle at a lower end thereof, and to a lower surface of a floor at an upper end thereof.

* * * * *